(12) United States Patent
Lee et al.

(10) Patent No.: US 12,374,758 B2
(45) Date of Patent: Jul. 29, 2025

(54) SEPARATOR FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Sangho Lee, Yongin-si (KR); Imhyuck Bae, Yongin-si (KR); Jihyun Chun, Yongin-si (KR); Daehyun Hong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 750 days.

(21) Appl. No.: 17/294,757

(22) PCT Filed: Aug. 28, 2019

(86) PCT No.: PCT/KR2019/010967
§ 371 (c)(1),
(2) Date: May 18, 2021

(87) PCT Pub. No.: WO2020/111457
PCT Pub. Date: Jun. 4, 2020

(65) Prior Publication Data
US 2022/0021078 A1    Jan. 20, 2022

(30) Foreign Application Priority Data
Nov. 30, 2018    (KR) .................. 10-2018-0152652

(51) Int. Cl.
*H01M 50/491*    (2021.01)
*H01M 10/0525*    (2010.01)
(Continued)

(52) U.S. Cl.
CPC ..... *H01M 50/491* (2021.01); *H01M 10/0525* (2013.01); *H01M 10/4235* (2013.01);
(Continued)

(58) Field of Classification Search
CPC ............ H01M 50/491; H01M 50/489; H01M 50/417; H01M 50/431; H01M 50/443;
(Continued)

(56) References Cited

U.S. PATENT DOCUMENTS

| 2010/0136410 A1 | 6/2010 | Kawasoe et al. |
| 2012/0177976 A1 | 7/2012 | Wensley et al. |

(Continued)

FOREIGN PATENT DOCUMENTS

| EP | 2833439 A1 | 2/2015 |
| EP | 3312221 A1 | 4/2018 |

(Continued)

OTHER PUBLICATIONS

European Search Report dated May 26, 2023, of the corresponding European Patent Application No. 19889395.0.

(Continued)

*Primary Examiner* — Jonathan G Jelsma
(74) *Attorney, Agent, or Firm* — Lee IP Law, P.C.

(57) ABSTRACT

The present invention relates to a separator for a lithium secondary battery and a lithium secondary battery including the separator, the separator for a lithium secondary battery including: a polyolefin-based porous substrate; and a coating layer on at least one surface of the polyolefin-based porous substrate, wherein a coefficient of performance Q1 of the polyolefin-based porous substrate as represented by Equation 1 is greater than or equal to 1.2 (gf/nm·μm), a coefficient of performance Q2 of the polyolefin-based porous substrate as represented by Equation 2 is greater than or equal to 0.25 (gf/nm·%), and the coating layer includes a binder and inorganic particles.

(Continued)

$$Q1 = \frac{P(gf)}{S(nm) \times T(\mu m)} \quad \text{[Equation 1]}$$

$$Q2 = \frac{P(gf)}{S(nm) \times R(\%)} \quad \text{[Equation 2]}$$

Detailed descriptions of Equations 1 and 2 are as described in the specification.

9 Claims, 1 Drawing Sheet

(51) Int. Cl.
| | | |
|---|---|---|
| | *H01M 10/42* | (2006.01) |
| | *H01M 50/417* | (2021.01) |
| | *H01M 50/431* | (2021.01) |
| | *H01M 50/443* | (2021.01) |
| | *H01M 50/449* | (2021.01) |
| | *H01M 50/489* | (2021.01) |

(52) U.S. Cl.
CPC ....... *H01M 50/417* (2021.01); *H01M 50/431* (2021.01); *H01M 50/443* (2021.01); *H01M 50/449* (2021.01); *H01M 50/489* (2021.01)

(58) Field of Classification Search
CPC ........... H01M 50/449; H01M 10/0525; H01M 10/4235
See application file for complete search history.

(56) References Cited

U.S. PATENT DOCUMENTS

| | | |
|---|---|---|
| 2013/0177755 A1 | 7/2013 | Kang et al. |
| 2015/0050545 A1 | 2/2015 | Murata et al. |
| 2016/0268571 A1 | 9/2016 | Honda |
| 2017/0155113 A1 | 6/2017 | Hashiwaki et al. |
| 2018/0175353 A1 | 6/2018 | Sakimoto et al. |
| 2018/0323414 A1 | 11/2018 | Hashiwaki et al. |
| 2019/0051906 A1 | 2/2019 | Rhee et al. |
| 2020/0020908 A1* | 1/2020 | Nishimura .......... H01M 50/489 |
| 2021/0050618 A1 | 2/2021 | Wensley et al. |

FOREIGN PATENT DOCUMENTS

| | | |
|---|---|---|
| KR | 10-2009-0079943 A | 7/2009 |
| KR | 2013-0080928 A | 7/2013 |
| KR | 10-2016-0107353 A | 9/2016 |
| KR | 10-1674988 B1 | 11/2016 |
| KR | 10-2017-0051736 A | 5/2017 |
| KR | 10-2017-0080553 A | 7/2017 |
| KR | 10-2017-0127723 A | 11/2017 |
| KR | 10-2018-0037617 A | 4/2018 |
| WO | WO-2014079177 A1 * | 5/2014 ............ C08F 220/06 |
| WO | WO 2015/194504 A1 | 12/2015 |

OTHER PUBLICATIONS

International Search Report dated Dec. 2, 2019 for PCT/KR2019/010967 filed Aug. 28, 2019.

* cited by examiner

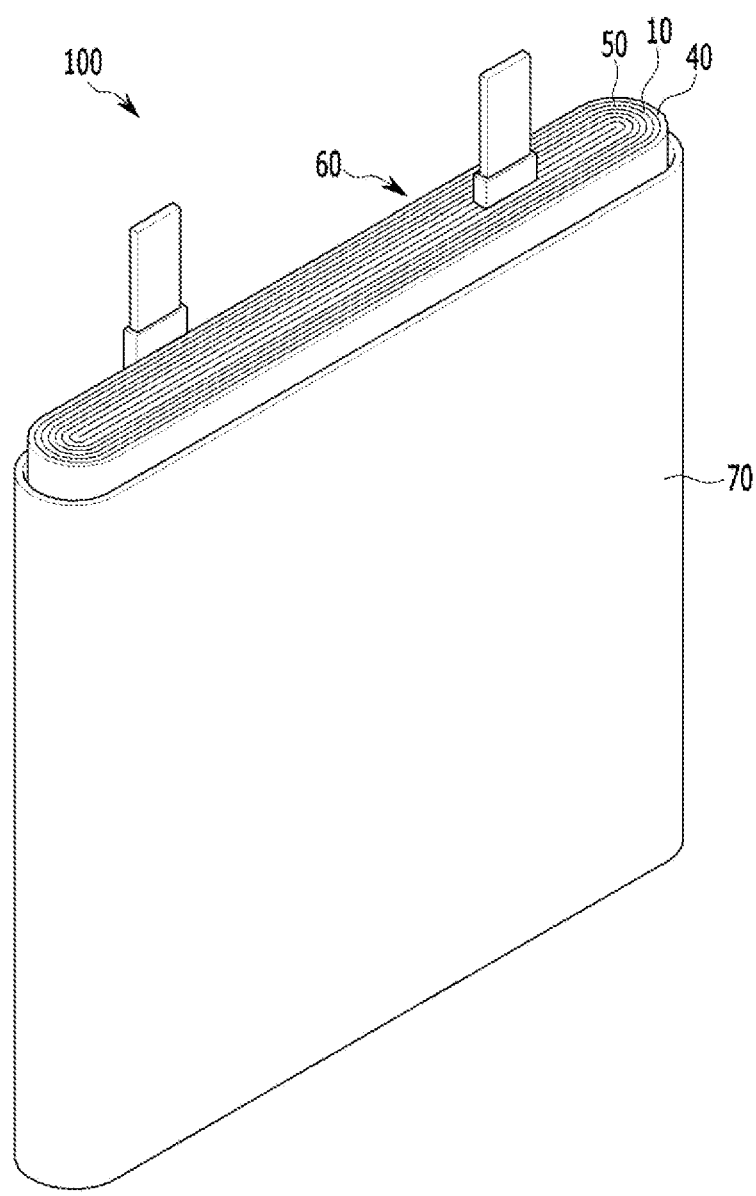

SEPARATOR FOR LITHIUM SECONDARY BATTERY AND LITHIUM SECONDARY BATTERY COMPRISING SAME

CROSS REFERENCE TO RELATED APPLICATIONS

This is the U.S. national phase application of PCT/KR2019/010967, filed Aug. 28, 2019, which is based on Korean Patent Application No. 10-2018-0152652, filed Nov. 30, 2018, the entire contents of all of which are hereby incorporated by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery.

In this way, as the battery temperature increases, the separator melts and rapidly shrinks or breaks, thereby causing a short circuit again. In order to prevent this, development of a battery capable of expressing shutdown characteristics of closing pores of the separator at a high temperature is being made.

When the shutdown characteristics are expressed under high temperature conditions, since a secondary battery is suppressed from additional exothermic conditions due to a high temperature such as an overcharge and the like, early shutdown of the separator in the high temperature state may improve safety of the secondary battery.

DISCLOSURE

Technical Problem

A lithium secondary battery having improved safety and cycle-life characteristics by preventing overcharging is provided.

Technical Solution

In an embodiment, a separator for a lithium secondary battery includes a polyolefin-based porous substrate; and a coating layer on at least one surface of the polyolefin-based porous substrate, wherein a coefficient of performance Q1 of the polyolefin-based porous substrate as represented by Equation 1 is greater than or equal to 1.2 (gf/nm·μm), a coefficient of performance Q2 of the polyolefin-based porous substrate as represented by Equation 2 is greater than or equal to 0.25 (gf/nm·%), and the coating layer includes a binder and inorganic particles.

$$Q1 = \frac{P(gf)}{S(nm) \times T(\mu m)} \quad \text{[Equation 1]}$$

$$Q2 = \frac{P(gf)}{S(nm) \times R(\%)} \quad \text{[Equation 2]}$$

In Equations 1 and 2, P is a puncture strength of the polyolefin-based porous substrate, S is an average pore diameter of the polyolefin-based porous substrate, T is a thickness of the polyolefin-based porous substrate, and R is a porosity of the polyolefin-based porous substrate.

In another embodiment, a lithium secondary battery includes a positive electrode, a negative electrode, and the aforementioned separator for a lithium secondary battery between the positive electrode and the negative electrode.

Advantageous Effects

By preventing overcharging, a lithium secondary battery with improved safety and excellent cycle-life characteristics may be implemented.

DESCRIPTION OF THE DRAWINGS

FIG. 1 is an exploded perspective view of a lithium secondary battery according to an embodiment.

DESCRIPTION OF SYMBOLS

10: separator
40: positive electrode
50: negative electrode
60: electrode assembly
70: case
100: lithium secondary battery

MODE FOR INVENTION

Hereinafter, embodiments of the present invention are described in detail. However, these embodiments are exemplary, the present invention is not limited thereto and the present invention is defined by the scope of claims.

A separator for a lithium secondary battery according to an embodiment includes a polyolefin-based porous substrate, and a coating layer disposed on one surface or both surfaces of the polyolefin-based porous substrate.

The polyolefin-based porous substrate may have a plurality of pore and may generally be a porous substrate used in an electrochemical device. The olefin used in the present invention may be, for example, ethylene, propylene, butene, hexane, and the like. Specific examples of the polyolefin may include any one polymer selected from a polyethylene-based resin, for example low-density polyethylene, linear polyethylene (ethylene-α-olefin copolymer), high-density polyethylene, and a polypropylene-based resin, or a copolymer or a mixture of two or more of them. For example, the polypropylene and an ethylene-propylene copolymer, poly(4-methylpentene-1), poly(butene-1), and an ethylene-vinyl acetate copolymer may be included.

The polyolefin-based porous substrate has an excellent shutdown function and may contribute to improving the safety of a battery. The polyolefin-based porous substrate may be, for example, selected from selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin resin may include a non-olefin resin in addition to the olefin resin, or may include a copolymer of an olefin and a non-olefin monomer.

The polyolefin-based porous substrate according to the present invention may have a coefficient of performance optimized to realize excellent shutdown function to prevent overcharging and cycle-life characteristics, contributing to the safety and cycle-life improvement of a lithium secondary battery including the same.

Puncture strengths, average pore diameters, porosities, and air permeability are physical properties that directly affect the safety and performance of the battery while affecting each other, so the coefficient of performance as the equations in which they are combined may be important indices determining the characteristics of the battery. In the present invention, as shown below, the coefficient of performance is defined as a coefficient of performance Q1 represented by Equation 1, Q2 represented by Equation 2, and Q3 represented by Equation 3 according to a factor included in the equations.

$$Q1 = \frac{P(gf)}{S(nm) \times T(\mu m)}$$ [Equation 1]

$$Q2 = \frac{P(gf)}{S(nm) \times R(\%)}$$ [Equation 2]

$$Q3 = \frac{P(gf)}{G(sec/100\ cc)}$$ [Equation 3]

In Equations 1 to 3, P is a puncture strength of the polyolefin-based porous substrate, S is an average pore diameter of the polyolefin-based porous substrate, T is a thickness of the polyolefin-based porous substrate, R is a porosity of the polyolefin-based porous substrate, and G is air permeability of the polyolefin-based porous substrate.

For the measurement of each physical property, a method commonly used in the technical field of the present invention may be used, and the following methods are used as a non-limiting example in the present invention.

(Measurement of Puncture Strength)

Non-limiting examples of a method of measuring the puncture strength are as follow: ten specimens are prepared by cutting a separator into a width (MD) of 50 mm×a length (TD) of 50 mm at 10 different points, placed on a 10 cm hole by using a KES-G5 equipment made by Kato Tech Co., Ltd., and then, three times measured with respect to a force with which each specimen is punctuated, while pressed with a 1 mm probe, and the three measurements per specimen are averaged. Herein, the measured force is expressed by a unit of gf.

The polyethylene-based porous substrate according to the present embodiment may have a puncture strength of greater than or equal to 350 gf, for example, 350 gf to 500 gf, 350 gf to 450 gf, or 350 gf to 420 gf.

Meanwhile, the puncture strength standardized by the thickness of the polyolefin-based porous substrate may be greater than or equal to 0.4 N/μm, for example, greater than or equal to 0.5 N/μm.

(Measurement of Average Pore Diameter)

Non-limiting examples of a method of measuring the average pore diameter is as follows: a mean pore size is determined in a half dry method according to ASTM F316-03. A capillary flow porometer (model name: CFP-1500-AEL, Porous Material Inc.) is used, and specimens are prepared to have a size of 3 cm×3 cm and dipped in Galwick oil (surface tension: 15.9 dynes/cm) for 5 to 8 seconds and then, mounted on the equipment. A test type of wet up/dry up is selected among the test types of the capillary flow porometry. A wet curve is used to calculate a pore size distribution (calculated in the equipment), and a pressure where the wet curve meets a half dry curve is used to determine the mean pore size. (calculated from the equipment)

A polyethylene-based porous substrate according to the present example embodiment may have an average pore diameter of greater than or equal to 50 nm, for example, 30 nm to 40 nm or 35 nm to 40 nm.

(Measurement of Porosity)

Non-limiting examples of a method of measuring the porosity is as follows:

Porosity of a base film is calculated by using a thickness and an area of a separator to obtain a volume, measuring a weight thereof, and reflecting specific gravity (0.95 g/cm$^3$) of high density polyethylene and expressed as vol %.

The polyethylene-based porous substrate according to the present embodiment may have a porosity of less than 40%, for example, 30% to 40%.

(Measurement of Air Permeability)

Non-limiting examples of a method of measuring the air permeability is as follows: ten specimens are prepared by cutting a separator at ten different points, and an air permeability-measuring equipment (EG01-55-1MR, Asahi Seiko Co., Ltd.) is used to five times per specimen measure how long it takes for a circular separator with a diameter of 1 inch to transmit 100 cc of air, and the five measurements are averaged.

A polyethylene-based porous substrate according to the present example embodiment may have air permeability of less than or equal to 20 sec/100 cc·μm per unit thickness. Within the range, sufficient ion conductivity is secured, improving battery characteristics.

In an embodiment, a coefficient of performance Q1 of the polyolefin-based porous substrate is greater than or equal to 1.2 (gf/nm·μm), and a coefficient of performance Q2 thereof may be greater than or equal to 0.25 (gf/nm·%).

When the coefficients of performance Q1 and Q2 are within the ranges, an electrolyte may be sufficiently impregnated into a separator formed as a thin film, strength of the separator may be improved, and a shutdown function of preventing an overcharge under external temperature/pressure conditions may be expressed, improving reliability and cycle-life characteristics of a lithium secondary battery.

The Q1 may be, for example, greater than or equal to 1.2 (gf/nm·μm) and less than 2 (gf/nm·μm), and specifically 1.2 (gf/nm·μm) to 1.7 (gf/nm·μm).

The Q2 may be, for example, 0.25 (gf/nm·%) to 0.3 (gf/nm·%).

The coefficient of performance Q3 of the polyolefin-based porous substrate may be greater than or equal to 13 (gf/(sec/100 cc)), for example, 13 (gf/(sec/100 cc)) to 20 (gf/(sec/100 cc)).

The polyolefin-based porous substrate may have a thickness of about 1 μm to 10 μm, for example, 3 μm to 10 μm, 5 μm to 10 μm, 5 μm to 9 μm, or 5 μm to 8 μm when applied to a high-capacity thin film battery.

The coating layer includes a binder and inorganic particles.

The binder may include, for example, a non-cross-linked binder. The non-cross-linked binder may be, for example, a polyvinylidene fluoride homopolymer, a polyvinylidene fluoride-hexafluoropropylene copolymer, a polyvinylidene fluoride-trichloroethylene copolymer, polymethylmethacrylate, polyacrylonitrile, polyvinylpyrrolidone, polyvinylacetate, polyvinyl alcohol, a polyethylene-vinylacetate copolymer, polyvinylether, polyethyleneoxide, polyimide, polyamic acid, polyamideimide, aramid, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxylmethyl cellulose, an acrylonitrile-styrene-butadiene copolymer, or a copolymer thereof, or a combination thereof.

The binder may include, for example, a cross-linked binder. The cross-linked binder may be obtained from monomer, oligomer and/or polymer reactive to heat and/or light, for example, may be obtained from a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The cross-linked binder may be obtained by curing monomer, oligomer and/or polymer having at least two (meth) acrylate groups, which may be obtained by curing, for example, ethylene glycol di(meth)acrylate, propylene glycol di(meth)acrylate, polyethylene glycol di(meth)acrylate, polypropylene glycol di(meth)acrylate, butanediol di(meth) acrylate, hexamethylene glycol di(meth)acrylate, trimethylolpropane tri(meth)acrylate, glycerine tri(meth)acrylate, pentaerythritol tetra(meth)acrylate, diglycerine hexa(meth) acrylate, or a combination thereof.

For example, the cross-linked binder may be obtained by curing monomer, oligomer and/or polymer having at least two epoxy groups, for example, by curing bisphenol A diglycidyl ether, bisphenol F diglycidyl ether, hexahydrophthalic glycidyl ester, or a combination thereof.

For example, the cross-linked binder may be obtained by curing monomer, oligomer and/or polymer having at least two isocyanate groups, which may be obtained by curing, for example, diphenylmethane diisocyanate, 1,6-hexamethylene diisocyanate, 2,2,4(2,2,4)-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The coating layer may improve heat resistance by the inorganic particles and may prevent abrupt shrinkage or deformation of a separator due to increase of a temperature. The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical, plate, cubic, or amorphous shape. An average particle diameter of the inorganic particle may range about 1 nm to 2500 nm, within the range, 100 nm to 2000 nm, or 200 nm to 1000 nm, for example about 300 nm to 800 nm. The average particle diameter of the inorganic particles may be particle size ($D_{50}$) at a volume ratio of 50% in a cumulative size-distribution curve. By using the inorganic particles having an average particle diameter within the ranges, the coating layer may have an appropriate strength, thereby improving heat resistance, durability, and stability of the separator.

The inorganic particles may be included in an amount of 50 wt % to 99 wt % based on the coating layer. In an embodiment, the inorganic particles may be included in an amount of 70 wt % to 99 wt %, for example 80 wt % to 99 wt %, 85 wt % to 99 wt %, 90 wt % to 99 wt %, or 95 wt % to 99 wt % based on the coating layer. When the inorganic particles are included within the ranges, the separator for a lithium secondary battery according to an embodiment may exhibit improved heat resistance, durability, and stability.

In the coating layer, the binder:inorganic particles may be included in a weight ratio of 1:1 to 1:7, and an appropriate weight ratio may be 1:2 to 1:6, and more desirably 1:3 to 1:5. When the binder and inorganic particles are included in the coating layer within the range, the separator may exhibit improved adherence and air permeability.

The separator for a lithium secondary battery according to an embodiment may be manufactured by known various methods. For example, the separator for a lithium secondary battery may be formed by coating a composition for forming the coating layer on one surface or both surfaces of the porous substrate and then drying the same.

The composition for forming the coating layer may include a solvent in addition to the aforementioned binder and inorganic particles. The solvent is not particularly limited if the solvent may dissolve or disperse the binder and the inorganic particles.

The coating may be, for example, performed by spin coating, dip coating, bar coating, die coating, slit coating, roll coating, inkjet printing, and the like, but is not limited thereto.

The drying may be, for example, performed through drying with warm air, hot air, or low humid air, vacuum-drying, or radiation of a far-infrared ray, an electron beam, and the like, but is not limited thereto. The drying process may be, for example, performed at a temperature of 25° C. to 120° C.

The separator for a lithium secondary battery may be manufactured by lamination, coextrusion, and the like besides the above method.

In an embodiment, the air permeability of the separator for a lithium secondary battery may be less than or equal to 250 (sec/100 cc), for example, 230 (sec/100 cc) or 160 to 220 (sec/100 cc).

In addition, the puncture strength of the separator for a lithium secondary battery may be greater than or equal to 350 gf, for example, 350 gf to 510 gf or 370 gf to 510 gf. In this case, the separator may contribute to improving battery performance by having an appropriate puncture strength.

The methods of measuring the air permeability and puncture strength of the separator are the same as described above.

Hereinafter, a lithium secondary battery including the separator for a lithium secondary battery will be described.

A lithium secondary battery may be classified into a lithium ion battery, a lithium ion polymer battery, and a lithium polymer battery depending on kinds of a separator and an electrolyte and also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, a prismatic lithium secondary battery as an example of a lithium secondary battery is explained. FIG. 1 is an exploded perspective view of a lithium secondary battery according to an embodiment. Referring to FIG. 1, a lithium secondary battery 100 according to an embodiment includes a wound electrode assembly 60 including a separator 10 interposed between a positive electrode 40 and a negative electrode 50, and a case 70 housing the electrode assembly 60.

The electrode assembly 60 is formed by interposing a separator 10 between the positive electrode 40 and the negative electrode 50 and then winding them into a jelly-roll shape.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically at least one of a composite oxide or a composite phosphate of a metal selected from cobalt, manganese, nickel, aluminum, iron, or a combination thereof and lithium may be used. For example, the positive active material may be lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, plate, flake, spherical, or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 50 may be the same as the binder and conductive material of the positive electrode 40.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt.

The organic solvent serves as a medium for transmitting ions taking part in the electrochemical reaction of a battery. The organic solvent may include, for example, a carbonate-based, ester-based, ether-based, ketone-based, alcohol-based, or aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran and the like, and the ketone-based solvent may be cyclohexanone, and the like. The alcohol-based solvent may be ethanol, isopropyl alcohol and the like, and the aprotic solvent may be nitriles such as R—CN (R is a C2 to C20 linear or branched or cyclic hydrocarbon group, an aromatic ring, or an ether bond), and the like, amides such as dimethyl formamide, and the like, dioxolanes such as 1,3-dioxolane, and the like, sulfolanes, and the like.

The organic solvent may be used alone or in a mixture. When the organic solvent is used in a mixture, the mixture ratio can be controlled in accordance with a desirable battery performance.

The lithium salt dissolved in an organic solvent supplies a battery with lithium ions, basically operates the lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Hereinafter, the embodiments are illustrated in more detail with reference to examples. However, the examples described below are only for illustrating or explaining the present invention in detail, and the present invention is not limited thereto.

(Manufacture of Polyethylene-Based Porous Substrate)

Example 1

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. Simultaneous elongating (elongation ratio: 7×7) was performed in the direction (Machine Direction, MD) and the width direction (Transverse Direction, TD) at 110° C. for the cast film.

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture a porous substrate having a thickness of 8 μm.

Examples 2 to 4

70 wt % of high density polyethylene (HDPE) with a viscosity average molecular weight of 350,000 g/mol (Mitsui Chemical Inc.) and 30 wt % of ultra high molecular weight polyethylene (UHMWPE) with a weight average molecular weight of 1,000,000 g/mol (Mitsui Chemical Inc.) were supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. The cast film was elongated in the machine direction (MD) at 90° C. and then elongated in the transverse direction (TD) at 110° C. (elongation ratio: 7×7).

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture porous substrates having each thickness of 8.5 μm, 7.5 μm, and 6.5 μm.

Comparative Example 1

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. Simultaneous elongating (elongation ratio: 7×7) was performed in the direction (Machine Direction, MD) and the width direction (Transverse Direction, TD) at 110° C. for the cast film.

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.3→1.1, elongation temperature 128° C.) to manufacture a porous substrate having a thickness of 9 μm.

Comparative Example 2

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. The cast film was elongated in the machine direction (MD) at 90° C. and then elongated in the transverse direction (TD) at 110° C. (elongation ratio: 7×5).

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture a porous substrate having a thickness of 9 μm.

Comparative Example 3

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. The cast film was elongated in the machine direction (MD) at 90° C. and then elongated in the transverse direction (TD) at 110° C. (elongation ratio: 7×8).

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture a porous substrate having a thickness of 7 μm.

Comparative Examples 4 and 5

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. Simultaneous elongating (elongation ratio: 7×7) was performed in the direction (Machine Direction, MD) and the width direction (Transverse Direction, TD) at 110° C. for the cast film.

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.3→1.1, elongation temperature 128° C.) to manufacture porous substrates having each thickness of 7 μm and 6 μm.

Comparative Example 6

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. Simultaneous elongating (elongation ratio: 7×7) was performed in the direction (Machine Direction, MD) and the width direction (Transverse Direction, TD) at 110° C. for the cast film.

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture a porous substrate having a thickness of 6 μm.

Comparative Example 7

High density polyethylene (HDPE) with a viscosity average molecular weight of 500,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. The cast film was elongated in the machine direction (MD) at 90° C. and then elongated in the transverse direction (TD) at 110° C. (elongation ratio: 7×8).

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.4→1.2, elongation temperature of 128° C.) to manufacture a porous substrate having a thickness of 6 μm.

Comparative Example 8

High density polyethylene (HDPE) with a viscosity average molecular weight of 350,000 g/mol (Mitsui Chemical Inc.) was supplied to a twin-screw extruder, and liquid paraffin was injected into the twin-screw extruder in a weight ratio of 70 (liquid paraffin) to 30 (polyethylene) and then, extruded.

After the extrusion, the gel obtained through the T-die was used to prepare a cast film in the form of a sheet using a cooling roll. Simultaneous elongating (elongation ratio: 6×6) was performed in the direction (Machine Direction, MD) and the width direction (Transverse Direction, TD) at 120° C. for the cast film.

The elongated film was dipped in a water-methylene chloride zone in which methylene chloride and a water layer was formed on top of the methylene chloride to extract liquid paraffin, and then transferred to a drying roll and dried.

Then, the dried film was subjected to heat setting of secondary elongating in a transverse direction (transverse elongation ratio: 1.0→1.3→1.1, elongation temperature of 128° C.) to manufacture a porous substrate having a thickness of 6 μm.

(Manufacture of Coated Separator)

Preparation Example and Comparative Preparation Example

A PVdF-HFP polymer having a weight average molecular weight (Mw) of 1,000,000 g/mol (a mole ratio of PVdF: HFP=9:1, a glass transition temperature: −30° C., a melting point: 150° C.) as a fluorine-based binder was added at 10 wt % to acetone and then, stirred with a stirrer at 45° C. for 3 hours to prepare a binder solution. Subsequently, alumina ($Al_2O_3$) (AES-11, Sumitomo Corp.) was added at 25 wt % to the acetone and then, dispersed through milling with a beads mill at 25° C. for 4 hours to prepare inorganic dispersion. The binder and the alumina were mixed in a weight ratio of 1:3 and stirred with a power mixer at 25° C. for 2 hours to prepare a coating liquid. Each coating liquid according to Examples 1 to 4 and Comparative Examples 1 to 8 was coated on both surfaces of a polyethylene-based porous substrate in a direct metering (direct quantification) method at 80 m/min and dried at 65° C. under an absolute water vapor amount (average value) of 17 $g/m^3$ to manufacture a separator with a coating layer. A coating amount of the coating layer was adjusted into 3.5 $g/m^2$.

TABLE 1

| | Polyolefin-based porous substrate | | | | | | | | | Coated separator | | |
|---|---|---|---|---|---|---|---|---|---|---|---|---|
| | Thickness (μm) | Puncture strength (gf) | Puncture strength (N/μm) | Air permeability (sec/100 cc) | Porosity (vol %) | Average pore diameter (nm) | Coefficient of performance Q1 | Coefficient of performance Q2 | Coefficient of performance Q3 | Thickness (μm) | Air permeability (sec/100 cc) | Puncture strength (gf) |
| Ex. 1 | 8.0 | 355 | 0.44 | 155 | 38.0 | 36 | 1.233 | 0.27 | 15.3 | 11.0 | 210 | 375 |
| Ex. 2 | 8.5 | 484 | 0.56 | 154 | 38.0 | 36 | 1.582 | 0.37 | 16.5 | 11.5 | 220 | 505 |
| Ex. 3 | 7.5 | 415 | 0.54 | 115 | 39.7 | 40 | 1.383 | 0.27 | 18.0 | 10.5 | 165 | 435 |
| Ex. 4 | 6.5 | 380 | 0.57 | 112 | 39.4 | 35 | 1.670 | 0.29 | 18.8 | 9.5 | 160 | 400 |
| Comp. Ex. 1 | 9.0 | 315 | 0.34 | 165 | 37.0 | 42 | 0.833 | 0.22 | 12.7 | 12.0 | 230 | 335 |
| Comp. Ex. 2 | 9.0 | 335 | 0.37 | 135 | 38.5 | 42 | 0.886 | 0.22 | 31.0 | 12.0 | 190 | 355 |
| Comp. Ex. 3 | 7.5 | 354 | 0.46 | 100 | 42.0 | 50 | 0.944 | 0.18 | 44.3 | 10.5 | 145 | 370 |
| Comp. Ex. 4 | 7.5 | 270 | 0.35 | 160 | 37.0 | 43 | 0.837 | 0.18 | 16.9 | 10.5 | 230 | 291 |
| Comp. Ex. 5 | 6.0 | 230 | 0.38 | 150 | 37.0 | 35 | 1.095 | 0.19 | 12.8 | 9.0 | 220 | 252 |
| Comp. Ex. 6 | 6.0 | 220 | 0.36 | 100 | 40.0 | 37 | 0.991 | 0.16 | 14.7 | 9.0 | 145 | 243 |
| Comp. Ex. 7 | 6.5 | 313 | 0.47 | 123 | 36.0 | 38 | 1.267 | 0.24 | 28.3 | 9.5 | 160 | 335 |
| Comp. Ex. 8 | 6.0 | 255 | 0.42 | 113 | 40.0 | 34 | 1.250 | 0.21 | 10.7 | 9.0 | 150 | 279 |

Evaluation 1: Overcharge Test

An overcharge test for examining safety of the separator was performed in the following method. A cathode was manufactured by coating LiCoO$_2$ on both surfaces of an aluminum thin film, and an anode was manufactured by coating graphite on both surfaces of a copper. Subsequently, electrode tabs were welded to the cathode and the anode, and the cathode and the anode with the separator were wound to obtain a jelly-roll electrode assembly. The electrode assembly was inserted in a pouch and assembled, and then, an electrolyte solution was injected thereinto. The electrolyte solution injected into a battery cell was prepared by mixing ethylene carbonate, ethyl methyl carbonate, and diethyl carbonate in a volume ratio of 3:5:2 and dissolving 1.15 M of LiPF$_6$ therein, and after injecting it into the pouch cell, the cell was sealed to manufacture a lithium ion battery cell with capacity of 3000 mAh. All the process was performed in a dry room to prevent moisture penetration thereinto.

The lithium ion battery cell manufactured in the above method was evaluated, after rated-discharged in standard environments and then, allowed to stand for 24 hours or more. The cell was charged at 3.0 C (maximum charge current 1.0 C*3 times) and 4.6 V for 2.5 hours. After a maximum temperature evaluation, safety of the cell against an overcharge was examined by observing occurrences and appearances. When overcharge characteristics are not insufficient, a cell may be exploded or ignited, which may even faster occur.

When exploded or ignited within 150 minutes, it was evaluated as Fail, but when not exploded or ignited within 150 minutes, it was evaluated as Pass.

Evaluation 2: Short Test During Assembly Process

Resistance was measured by applying DC 250 V to (+)/(−) tabs of a Jelly roll formed by stacking and welding cathode/separator/anode/separator in order and using a LCR meter. When the measurement value was less than 1.0 MΩ, it was marked as Fail, but when the measurement value was within the range of 1.0 MΩ to 2.9 MΩ, it was marked as Pass.

Evaluation 3: Cell Thickness Evaluation

A cell thickness was measured by rated-charging a cell after the rated discharge (rated-discharge condition: 0.2 C 2.75 V cut off, rated-charge condition: 0.2 C 4.40 V, 0.02 C cut off) and using PPG (500 g) having a resolution of 0.01 mm or less.

** Measurement method: Using PPG (500 g), the thickness of the cell was measured in the direction perpendicular to the tab. After the rated-discharge/rated-charge, compared with a shipping charge state of the cell, when the cell thickness increase was less than or equal to 3%, it was marked as OK, but when the cell thickness increase was greater than 3%, it was marked as NG.

Evaluation 4: State of Charge Evaluation

Rated-discharge capacity after 500 cycles was measured under the following conditions.

[Cycle-Life Cycle Condition]
charge condition: CC 0.8 C-4.40 V, Cut-off 0.02 C 23° C.
discharge condition: CC 1.0 C to 3.0 V 23° C.

[Discharge Capacity Measurement Condition]

After the 500 cycles, the cells were charged at 0.02 C under 0.2 C-4.40 V and paused for 10 minutes and then, discharged under 0.2 C-2.75 V. When discharge capacity was greater than or equal to 80%, compared with initial capacity, it was judged as OK, but when the discharge capacity was greater than or equal to less than 80%, it was judged as NG.

TABLE 2

| | Overcharge test | Assemble process short circuit test | Cell thickness | State of Charge |
|---|---|---|---|---|
| Example1 | Pass | Pass | OK | OK |
| Example2 | Pass | Pass | OK | OK |
| Example3 | Pass | Pass | OK | OK |
| Example4 | Pass | Pass | OK | OK |
| Comparative Example1 | Pass | Pass | NG | NG |
| Comparative Example2 | Fail | Pass | NG | NG |
| Comparative Example3 | Fail | Pass | OK | OK |
| Comparative Example4 | Pass | Fail | OK | NG |

TABLE 2-continued

|  | Overcharge test | Assemble process short circuit test | Cell thickness | State of Charge |
|---|---|---|---|---|
| Comparative Example5 | Pass | Fail | OK | OK |
| Comparative Example6 | Pass | Fail | OK | OK |
| Comparative Example7 | Pass | Fail | OK | OK |
| Comparative Example8 | Pass | Fail | OK | OK |

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A separator for a lithium secondary battery, the separator comprising:
a polyolefin-based porous substrate; and
a coating layer on at least one surface of the polyolefin-based porous substrate,
wherein a coefficient of performance Q1 of the polyolefin-based porous substrate as represented by Equation 1 is greater than or equal to 1.2 (gf/nm·μm),
wherein a coefficient of performance Q2 of the polyolefin-based porous substrate as represented by Equation 2 is 0.35 (gf/nm·%),
wherein the coating layer includes a binder and inorganic particles, and
wherein the polyolefin-based porous substrate has an air permeability of less than or equal to 20 (sec/100 cc·μm) per unit thickness, $$Q1 = \frac{P(gf)}{S(\text{nm}) \times T(\mu m)} \quad \text{[Equation 1]}$$

$$Q2 = \frac{P(gf)}{S(\text{nm}) \times R(\%)} \quad \text{[Equation 2]}$$

wherein, in Equations 1 and 2,
P is a puncture strength of the polyolefin-based porous substrate,
S is an average pore diameter of the polyolefin-based porous substrate,
T is a thickness of the polyolefin-based porous substrate, and
R is a porosity of the polyolefin-based porous substrate.

2. The separator of claim 1, wherein the polyethylene-based porous substrate has a porosity of less than 40%.

3. The separator of claim 1, wherein the polyolefin-based porous substrate has a thickness of 1 μm to 10 μm.

4. The separator of claim 1, wherein a puncture strength standardized by a thickness of the polyolefin-based porous substrate is greater than or equal to 0.4 N/μm.

5. The separator of claim 1, wherein the separator has an air permeability of less than or equal to 250 (sec/100 cc).

6. The separator of claim 1, wherein the separator has a puncture strength of greater than or equal to 350 gf.

7. The separator of claim 1, wherein the inorganic particles include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

8. The separator of claim 1, wherein the binder: inorganic particles are included in a weight ratio of 1:1 to 1:7.

9. A lithium secondary battery, comprising:
a positive electrode;
a negative electrode; and
the separator of claim 1 between the positive electrode and the negative electrode.

* * * * *